United States Patent
Matsumoto

(10) Patent No.: US 8,768,941 B2
(45) Date of Patent: Jul. 1, 2014

(54) DOCUMENT DATA PROCESSING DEVICE

(75) Inventor: Toshiko Matsumoto, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 115 days.

(21) Appl. No.: 13/380,561

(22) PCT Filed: Jul. 23, 2010

(86) PCT No.: PCT/JP2010/062417
§ 371 (c)(1),
(2), (4) Date: Mar. 27, 2012

(87) PCT Pub. No.: WO2011/013587
PCT Pub. Date: Feb. 3, 2011

(65) Prior Publication Data
US 2012/0179718 A1 Jul. 12, 2012

(30) Foreign Application Priority Data
Jul. 27, 2009 (JP) .................... 2009-174502

(51) Int. Cl.
*G06F 17/30* (2006.01)
(52) U.S. Cl.
CPC .................. *G06F 17/30722* (2013.01)
USPC ........................................... 707/755
(58) Field of Classification Search
USPC ........................................... 707/755
See application file for complete search history.

(56) References Cited

U.S. PATENT DOCUMENTS

| | | | |
|---|---|---|---|
| 6,035,061 A | 3/2000 | Katsuyama et al. | |
| 6,456,738 B1 | 9/2002 | Tsukasa | |
| 6,721,451 B1 | 4/2004 | Ishitani | |
| 7,149,347 B1 | 12/2006 | Wnek | |
| 2001/0042083 A1 | 11/2001 | Saito et al. | |
| 2005/0041860 A1* | 2/2005 | Jager | 382/173 |
| 2006/0143154 A1* | 6/2006 | Jager | 707/1 |
| 2010/0005049 A1 | 1/2010 | Kawai et al. | |

FOREIGN PATENT DOCUMENTS

| | | |
|---|---|---|
| JP | 11-328306 A | 11/1998 |
| JP | 11-184894 A | 7/1999 |
| JP | 2000-90117 A | 3/2000 |
| JP | 3425408 B2 | 5/2003 |
| JP | 3425834 B2 | 5/2003 |
| JP | 2007-219922 A | 8/2007 |
| JP | 2008-310531 A | 12/2008 |
| WO | 2008/093569 A1 | 8/2008 |

OTHER PUBLICATIONS

Katsuyama, Naoi, Takebe, "Automatic Title Extraction Methods for Business Documents," Fujitsu, 49, 5, pp. 404-409 (Sep. 1998).

(Continued)

*Primary Examiner* — Robert Beausoliel, Jr.
*Assistant Examiner* — Nirav K Khakhar
(74) *Attorney, Agent, or Firm* — Mattingly & Malur, PC

(57) ABSTRACT

There is provided a technique for automatically acquiring metadata with respect to various organizations which significantly reduces the man-hours required to prepare models for metadata extraction. With a pair comprising a document and metadata appearing therein as input, using a layout feature, and proximate text string and partial text string features with respect to metadata and a text string that is not metadata, the use of the layout feature, the proximate text string and the partial text string with respect to the automatic acquisition of metadata is automatically configured (see FIG. 1).

10 Claims, 13 Drawing Sheets

(56) References Cited

OTHER PUBLICATIONS

Y. shitani, Document Transformation System from Papers to XML Data Based on Pivot XML Document Method, Proceedings of the Seventh International Conference on Document Analysis and Recognition (2003).

F. Esposito et al., "Machine Learning methods for automatically processing historical documents: from paper acquisition to XML transformation," Proceedings of the First Inernational Workshop on Document Image Analysis for Libraries, 2004.

M. Kramer et al., "Bibliographic Meta-Data Extraction Using Probabilistic Finite State Transducers," Proceedings of International Conference on Document Analysis and Recognition, vol. 2, pp. 609-613, 2007.

D. Besagni et al., "Citation Recognition for Scientific Publications in Digital Libraries," Proceedings on the First International Workshop on Document Image Analysis for Libraries, 2004.

F. Parmentier et al., "Logical Structure Recognition of Scientific Bibliographic References," Proceedings on International Conference on Document Analysis and Recognition, pp. 1072-1076, 1997.

D. Besagni et al., "A segmentation method for bibliographic references by contextual tagging of fields," Proceedings on Seventh International Conference on Document Analysis and Recognition, vol. 1, pp. 384-388, 2003.

M. Imamura et al., "An Acquisition Method on Term Knowledge from Operating Manuals for Information Equipments by Using the Structure of Headline Sentences," IEEJ Trans. EIS, vol. 128, No. 12, pp. 1833-1841 (2008).

\* cited by examiner

Fig. 2

Document data

| Member name | Value |
|---|---|
| Document ID | Doc_0001 |
| File name | "SampleDocument001.pdf" |
| Content | [Text string data] |
| Document image | Graphic image |

200 — Document ID
201 — File name
202 — Content
203 — Document image

Text string data

| Member name | Value |
|---|---|
| Text string ID | Str_0001 |
| Text string | "Proposal" |
| Correct metadata specifying ID | Meta_01 |
| Adjacent text string ID | [[Str_0002, Str_0003], [Str_0004], [], [Str_0005, Str_0006]] |
| Adjacent cell text string ID | [[], [], [], []] |
| Layout feature | [true, true, false, true, ...] |

204 — Text string ID
205 — Text string
206 — Correct metadata specifying ID
207 — Adjacent text string ID
208 — Adjacent cell text string ID
209 — Layout feature

Fig. 3

Metadata type data

| Member name | Value |
|---|---|
| 300 Metadata type ID | Meta_01 |
| 301 Metadata type name | Title |
| 302 Used layout feature | [false, true, false, false, ...] |
| 303 Used proximate text string feature | [Proximate text string feature data] |
| 304 Used partial text string feature | ["Sheet", "Application Form", ...] |

Proximate text string feature data

| Member name | Value |
|---|---|
| 305 Text string | "To" (attached to the right side of recipient in documents written in Japanese) |
| 306 Directional specification | Adjacent on the right |

DOCUMENT DATA PROCESSING DEVICE

TECHNICAL FIELD

The present invention relates to a document data processing device, and to, by way of example, a technique for efficiently managing business document file data that exist in large amounts.

BACKGROUND ART

The need for a technique for efficiently handling documents within organizations is growing. By way of example, with the enactment of the Japanese SOX Act (the Financial Instruments and Exchange Act), the need for voucher management in the context of business operations by corporations is growing. In addition, by way of example, information within corporations, particularly document data that does not get stored in relational databases (not of a fixed format), is increasing rapidly (a phenomenon referred to as information explosion is taking place). Under such circumstances, the need for managing and searching for documents by such metadata as title, creation date, author, etc., is also growing. In the case of operational documents, for example, if searches could be carried out with such business IDs as document title, client name, creation date, order number, etc., it would be possible to quickly find documents required for internal control audits. Alternatively, in the case of design documents, if searches could be carried out by document title, department of origin, creation date, product code, etc., it would contribute to effective utilization of technical information. Further, in the case of record documents regarding complaints and malfunction information, if searches could be carried out by date of occurrence, date of handling, product name, monetary damage, component name, etc., it would contribute to faster handling should similar malfunctions occur. In addition, in the case of documents regarding operation rules, notifications, etc., if searches could be carried out by document type, creation date, period of implementation, etc., it would contribute to efficient operations that comply with the rules.

Numerous techniques for analyzing documents that are not of fixed formats and automatically acquiring metadata have been proposed (e.g., see Patent Documents 1 to 3, and Non-Patent Documents 1 and 2). These references assume that the document type of interest is defined in advance, and features of the metadata written in documents of that type are examined in detail, and held as a "model" for documents of the type of interest. Further, matching is performed between the model and text strings that appear in a document, and it is inferred which text string is which element in the model (i.e., which text string is metadata). As features, layout features (e.g., "title is often centered," etc.), features of text strings that appear in proximity to metadata (e.g., "order number often appears adjacent to the text string 'order number:' on the right," etc.), features of partial text strings of metadata (e.g., "client name often begins with '独立行政法人 (dokuritsu gyousei houjin, Japanese for 'Independent Administrative Institution')'") are used.

In addition, as presented in Patent Documents 4 to 6 and in Non-Patent Documents 3 to 8, efforts are already being made for automatically preparing models for automatically acquiring metadata.

PRIOR ART DOCUMENTS

Patent Documents

Patent Document 1: JP Patent Application Publication (Kokai) No. 11-184894 A (1999)
Patent Document 2: JP Patent No. 3425834
Patent Document 3: JP Patent No. 3425408
Patent Document 4: U.S. Pat. No. 7,149,347 B1
Patent Document 5: JP Patent Application Publication (Kokai) No. 2000-90117 A
Patent Document 6: JP Patent Application Publication (Kokai) No. 11-328306 A (1999)

Non-Patent Documents

Non-Patent Document 1: Katsuyama, Naoi, Takebe, "Automatic Title Extraction Methods for Business Documents," FUJITSU, 49, 5, pp. 404-409 (1998-09)
Non-Patent Document 2: Ishitani, Y., Document Transformation System from Papers to XML Data Based on Pivot XML Document Method, Proceedings of the Seventh International Conference on Document Analysis and Recognition (2003)
Non-Patent Document 3: F. Esposito, D. Malerba, G. Semeraro, S. Ferilli, O. Altamura, T. M. A. Basile, M. Berardi, M. Ceci, N. Di Mauro, "Machine Learning methods for automatically processing historical documents: from paper acquisition to XML transformation," Proceedings of the First Inernational Workshop on Document Image Analysis for Libraries, 2004
Non-Patent Document 4: M. Kramer, H. Kaprykowsky, D. Keysers, T. Breuel, "Bibliographic Meta-Data Extraction Using Probabilistic Finite State Transducers," Proceedings of International Conference on Document Analysis and Recognition, Vol. 2, pp. 609-613, 2007
Non-Patent Document 5: D. Besagni, A. Belaid, "Citation Recognition for Scientific Publications in Digital Libraries," Proceedings on the First International Workshop on Document Image Analysis for Libraries, 2004
Non-Patent Document 6: F. Parmentier, A. Belaid, "Logical Structure Recognition of Scientific Bibliographic References," Proceedings on International Conference on Document Analysis and Recognition, pp. 1072-1076, 1997
Non-Patent Document 7: D. Besagni, A. Belaid, N. Benet, "A segmentation method for bibliographic references by contextual tagging of fields," Proceedings on Seventh International Conference on Document Analysis and Recognition, vol. 1, pp. 384-388, 2003
Non-Patent Document 8: M. Imamura, Y. Takayama, M. Akiyoshi, and N. Komoda, "An Acquisition Method on Term Knowledge from Operating Manuals for Information Equipments by Using the Structure of Headline Sentences," IEEJ Trans. EIS, Vol. 128, No. 12, pp. 1833-1841 (2008)

SUMMARY OF THE INVENTION

Problems to be Solved by the Invention (1) In such processes for automatically acquiring metadata as those presented in Patent Documents 1 to 3 and in Non-Patent Documents 1 and 2, due to such operation principles as those discussed above, the completeness of the model greatly influences the ultimate metadata inference accuracy.

However, when models are prepared manually, such problems as those below are present, which is not efficient.

Problem 1 in preparing models: Configuring, in accordance with document features, settings as to which metadata is to be acquired using what sort of layout features is tedious. There are many types of layout features (underline, centering, font size, location within page, etc.), and an even greater number of combinations with respect to metadata type.

Problem 2 in preparing models: In applying layout features to models, fine adjustments need to be made taking into account what sorts of documents there are, how metadata appears, and how text strings other than metadata appear. By way of example, in operational documents, titles are underlined relatively often. However, monetary amounts and product names are underlined more often than titles are. Therefore, if it is described in a model that the presence/absence of an underline is to be used as a layout feature, monetary amounts or product names would be erroneously acquired as titles. In order to avoid this, it is necessary to make fine adjustments to the use of layout features.

Problem 3 in preparing models: Configuring, in accordance with document features, settings as to what sort of feature should be used, to acquire metadata, as a feature of text strings that appear in proximity to metadata is tedious. By way of example, with respect to text strings adjacent to whom an order number may be found on the right, there are such expressions as, besides "Order Number:" as mentioned above, "Order NO:", "Order No:", "Order No.:", "Order Form Number", "Order Placement Number", etc., and listing them without any omission contributes to the completeness of the model.

Problem 4 in preparing models: In applying features of text strings that appear in proximity to metadata, fine adjustments need to be made taking into account what sorts of documents there are, how metadata appears, and how text strings other than metadata appear. By way of example, in operational documents, client names often appear adjacent to "行 (Yuki, Japanese for 'to')" on the left. However, if text strings that appear adjacent to "行" on the left were to be acquired as client names, parts of 銀行 (Ginkou, Japanese for 'bank') names that are provided as directions on whom to make payments to would be erroneously acquired as client names on a frequent basis.

Problem 5 in preparing models: Configuring, in accordance with document features, settings as to what sort of feature should be used, to acquire metadata, as a feature of partial text strings of metadata is tedious. By way of example, since Hitachi Software Engineering Co., Ltd. has many business dealings with Hitachi's group companies, using "Hitachi" as a partial text string feature would be effective. Thus studying trends in business partners per organization and listing partial text strings contribute to the completeness of the model.

Problem 6 in preparing models: In applying features of partial text strings of metadata, fine adjustments need to be made taking into account what sorts of documents there are, how metadata appears, and how text strings other than metadata appear. By way of example, the text string "会社 (Kaisha, Japanese for 'company')" is often included in client names. However, if text strings including "会社" were to be acquired as client names, such text strings as "会社名 (kaisha mei, Japanese for 'company name')", etc., would be erroneously acquired as client names on a frequent basis.

(2) The techniques presented in Patent Documents 4 to 6 and in Non-Patent Documents 3 to 8 also have their respective problems, and are thus inapplicable to preparing models (features of interest within documents) for accurately acquiring metadata from documents that are not of fixed formats.

Specifically, Non-Patent Document 3, and Patent Documents 4, 5 and 6 discuss techniques where a model is prepared per detailed class of documents, such as "invoice," "housing loan application," etc. Thus, the types of documents handled are limited, and the idea of collectively handling a broad range of documents, such as "operational documents," "design documents," etc., is not addressed. As such, they cannot really be considered versatile techniques. In addition, changing the model used depending on the class is tedious, and is operationally impractical in terms of handling business documents efficiently.

In addition, Non-Patent Documents 4, 5, 6 and 7 target the references sections of research papers, and assume the use of text string information as input. Thus, they are incapable of handling document data that is spread with respect to a two-dimensional plane.

Further, Non-Patent Document 8 deals with manuals, and utilizes headline expressions. With respect to general business documents such as operational documents, design documents, etc., many documents do not include headline expressions, and such documents cannot be handled.

(3) The present invention is made in view of such circumstances, and provides a technique with which the man-hours required to prepare models for extracting metadata may be reduced significantly, and which automatically acquires metadata with respect to various organizations.

Means for Solving the Problems

In order to solve the problems mentioned above, a document data processing device according to the present invention determines whether or not a layout feature that metadata to be processed that is within document data to be processed has is effective in extracting the metadata to be processed, and outputs the result of that determination. More specifically, the document data processing device checks whether or not a layout feature that the metadata to be processed is manifested in a text string other than metadata in the document data to be processed, and determines, based on the result of that check, whether or not the layout feature is effective in extracting metadata. In addition, the document data processing device calculates, with respect to a plurality of document data to be processed and for which the same metadata type is specified, the number of documents in which the layout feature is manifested only in a text string of the metadata (n1) and the number of documents in which the layout feature is manifested only in a text string other than the metadata (n2), and outputs the numbers of documents. At the same time, if n1>n2, it presents information indicating that the layout feature in question is to be configured as a model of a feature of interest in automatically acquiring the metadata in question.

A document data processing device of the present invention determines whether or not a text string feature in proximity to metadata to be processed that is within document data to be processed is effective in extracting the metadata to be processed, and outputs the result of that determination. More specifically, the document data processing device checks whether or not a proximate text string feature is manifested in proximity to a text string other than the metadata to be processed, and determines, based on the result of that check, whether or not the proximate text string feature is effective in extracting the metadata to be processed.

Further, a document data processing device according to the present invention determines whether or not a partial text string feature included in metadata to be processed that is within document data to be processed is effective in extracting the metadata to be processed, and outputs the result of that determination. More specifically, the document data processing device checks whether or not a partial text string feature is included in a text string other than the metadata to be processed, and determines, based on the result of that check, whether or not the partial text string feature is effective in extracting the metadata to be processed.

Further features of the present invention will become apparent from the best modes for carrying out the present invention provided below as well as the accompanying drawings.

Effects of the Invention

With the present invention, the man-hours required to prepare models for extracting metadata may be reduced significantly, and it becomes possible to automatically acquire metadata in various organizations.

BRIEF DESCRIPTION OF THE DRAWINGS

FIG. 2 is a diagram showing data structure examples of document data and text string data.

FIG. 3 is a diagram showing data structure examples of metadata type data and proximate text string feature data.

MODES FOR CARRYING OUT THE INVENTION

Figure 1:
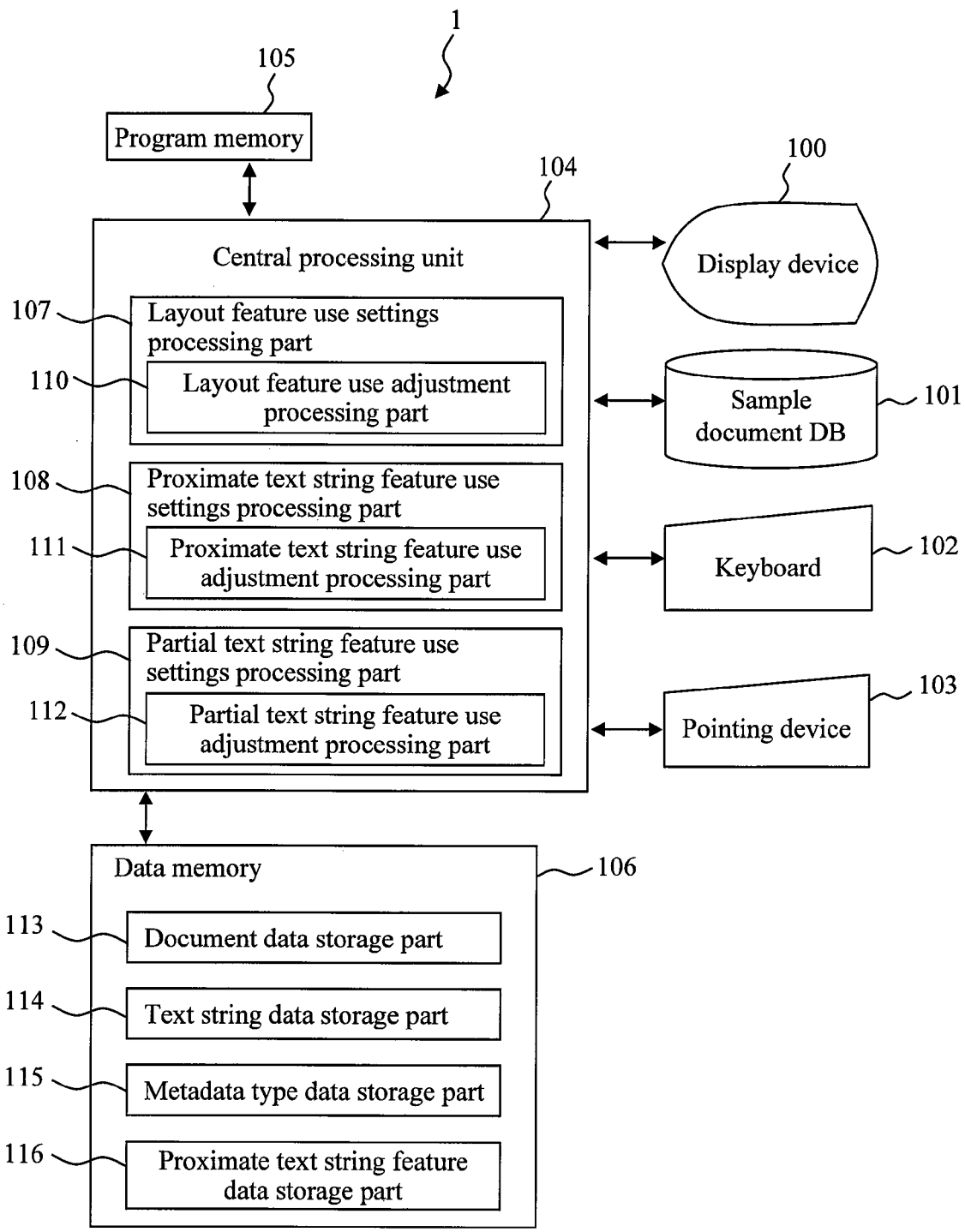
FIG. 1 is a functional block diagram showing a general configuration of a business document processing device according to the present invention.

The present invention relates to processes for preparing features (models) that are required in extracting metadata from documents. In the present embodiments, as models to be prepared, there are presented relationships with layout features of metadata, relationships with proximate text strings, and relationships with partial text strings included therein.

Embodiments of the present invention are described below with reference to the accompanying drawings. However, it should be noted that the present embodiments are merely examples for embodying the present invention, and they by no means limit the technical scope of the present invention. In addition, with respect to the various drawings, like features are given like reference numerals.

<Configuration of Business Document Managing Device>

FIG. 1 is a functional block diagram generally showing the internal configuration of a business document processing device according to an embodiment of the present invention. A business document processing device 1 comprises: a display device 100 for displaying data; a sample document DB 101; a keyboard 102 for performing such operations as selecting from a menu with respect to displayed data, etc.; a pointing device 103 such as a mouse, etc.; a central processing unit 104 that performs necessary computation processing, control processing, etc.; program memory 105 that stores a program that is required for the processing at the central processing unit 104; and data memory 106 that stores data that is required for the processing at the central processing unit 104.

The central processing unit 104 comprises: a layout feature use settings processing part 107 that configures a layout feature (e.g., "underline", "centering", etc.) to be used for metadata extraction; a proximate text string feature use settings processing part 108 that configures a proximate text string feature (e.g., "御中 (onchu, Japanese for 'to')", "様" (sama, formal title for addressing people)," etc.) to be used for metadata extraction; and a partial text string feature use settings processing part 109 that configures a partial text string (e.g., "株式会社 (kabushiki gaisha, Japanese for 'Co. Ltd.')," "会社 (kaisha, Japanese for 'company')," etc.) to be used for metadata extraction. In the case of the present embodiment, it is configured with a computer, and the layout feature use settings processing part 107, the proximate text string feature use settings processing part 108, and the partial text string feature use settings processing part 109 are all realized as parts of functions of programs that are run on the computer. It is noted that these programs are stored in the program memory 105.

The layout feature use settings processing part 107 comprises a layout feature use adjustment processing part 110, which checks what merits/demerits there are when a given layout feature (e.g., "underline") is used to extract metadata (e.g., "title") (i.e., whether or not it is effective for metadata extraction), and which ultimately executes a use/non-use adjustment process for the layout feature in question. The proximate text string feature use settings processing part 108 comprises a proximate text string feature use adjustment processing part 111, which checks what merits/demerits there are when a given proximate text string feature (e.g., "御中 (onchu, Japanese for 'to')") is used to extract metadata (e.g., "client name") (i.e., whether or not it is effective for metadata extraction), and which ultimately executes a use/non-use adjustment process for the proximate text string feature in question. Further, the partial text string feature use settings processing part 109 comprises a partial text string feature use adjustment processing part 112, which checks what merits/demerits there are when a given partial text string feature (e.g., "会社 (Kaisha, Japanese for 'company')") is used to extract metadata (e.g., "client name") (i.e., whether or not it is effective for metadata extraction), and which ultimately executes a use/non-use adjustment process for the partial text string feature in question.

The data memory 106 comprises: a document data storage part 113; a text string data storage part 114; a metadata type data storage part 115; and a proximate text string feature data storage part 116.

<Data Structures of Document Data and Text String Data>

FIG. 2 is a diagram showing data structures of document data and text string data stored in the document data storage part 113 and text string data storage part 114 included in the data memory 106.

The document data includes: a document ID 200; a file name 201 of the document; a content 202; and a document image 203. The content 202 is held in the form of a text string data structure array. In addition, the document image 203 holds a print image of the document in the form of an image.

The text string data includes: a text string ID 204; a content 205 of the text string; a correct metadata specifying ID 206; an adjacent text string ID 207; an adjacent cell text string ID 208, and a layout feature 209.

If the user has specified that he wishes to acquire that text string ("提案書 (teiansho, Japanese for 'proposal')" in the example in FIG. 2) as metadata, the correct metadata specifying ID 206 would hold the ID corresponding to the metadata type (the metadata type ID for "title" in the example in FIG. 2). If no such specification has been made, it would hold a NULL value.

The adjacent text string ID 207 holds adjacent text string information in the form of a two-level array. The first level represents the up, down, left and right directions, and the second level holds IDs of text strings if there are any adjacent text strings in the respective directions. By virtue of the fact that the second level is also an array, cases where there are a plurality of text strings that are adjacent in the same direction may be accommodated. In the example in FIG. 2, it is indicated that there are two adjacent text strings above the text string "提案書 (teiansho, Japanese for 'proposal')" (their respective text string IDs being Str__0002 and Str__0003), one adjacent text string below (its text string ID being Str__0004), two adjacent text strings on the right (their respective text string IDs being Str__0005 and Str__0006), and no adjacent text strings on the left.

If the text string of interest (e.g., "提案書 (teiansho, Japanese for 'proposal')") is included in a table, the adjacent cell text string ID 208 holds, much like the adjacent text string ID 207, adjacent cell information in the form of a two-level array. The first level represents the up, down, left and right directions, and the second level holds IDs of text strings if there are any text strings in the cells that are adjacent in those directions. In the case of text strings that are entered outside the table, text strings that are entered inside the table but do not have adjacent cells, or text strings that are entered inside the table and have adjacent cells but whose adjacent cells are empty, the array will be empty as in the example in FIG. 2.

The layout feature 209 holds information regarding the presence/absence of a plurality of types of layout features sequentially in the form of an array and what sort of layout features it has. By way of example, as examples of layout features, assuming, in order from the left, that they are centering, font, underline, bold, etc., whether or not these features are included is indicated as true or false.

<Data Structures of Metadata Type Data and Proximate Text String Feature Data>

FIG. 3 is a diagram showing data structures of the metadata type data 115 and proximate text string feature data 116 included in the data memory 106. Specifically, in the example in FIG. 3, it is indicated that when extracting "title" as metadata, the metadata in question may be extracted efficiently by focusing on features 302 to 304. It is noted that the data of 302 to 304 in FIG. 3 correspond to results (metadata extraction models) generated through the process in FIG. 4 (at least one process from among steps 401 to 403) using the data in FIG. 2.

The metadata type data includes, as information: a metadata type ID 300; a metadata type name 301; a used layout feature 302; a used proximate text string feature 303; and a used partial text string feature 304.

The used layout feature 302 holds, sequentially and in the form of an array, the use/non-use of a plurality of types of layout features. In the example in FIG. 3, it is indicated that, with respect to the metadata "title" and of the layout features 209 in FIG. 2, "font" is set as the layout feature to be used.

In addition, the used proximate text string feature 303 holds, in the form of an array of proximate text string feature data, information on a proximate text string that would be effective when used for metadata extraction. In the example in FIG. 3, it is indicated that the proximate text string "御中 (on-chu, Japanese for 'to')" is effective in extracting the metadata "title." In addition, the proximate text string feature data includes a text string 305 and a directional specification 306. In FIG. 3, there is shown an example where metadata is acquired using the feature that "the text string '御中' often appears 'adjacent to and on the right' of metadata."

The used partial text string feature 304 holds, in the form of a text string array, information on a partial text string that would be effective when used for metadata extraction. In the example in FIG. 3, it is indicated that utilizing the condition that the text strings "シート (shiito, transliteration for 'sheet')" and "申請書 (shinseisho, Japanese for 'application form')" be included in the metadata in question is effective in extracting the metadata "title."

<Metadata Extraction Model Generation Process (Overall)>

Figure 4:
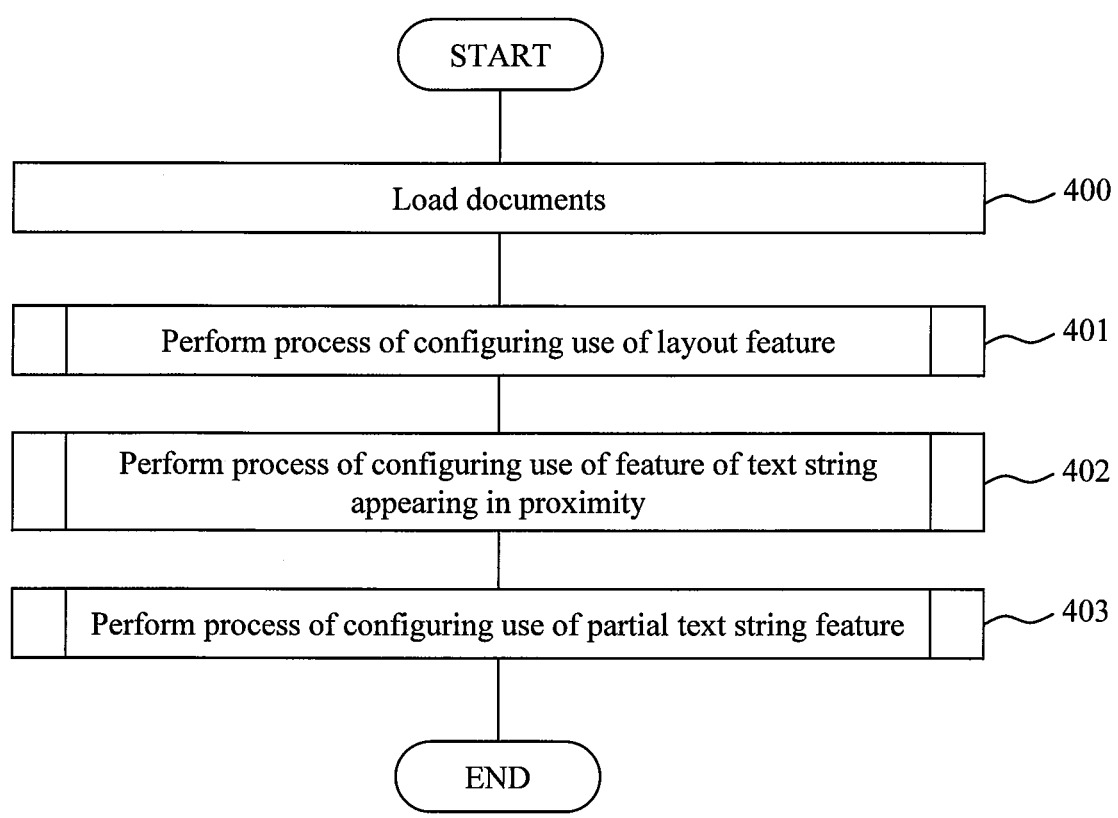
FIG. 4 is a flowchart illustrating as a whole a processing procedure executed by a business document processing device.

Next, a process performed at the business document processing device 1 of the present embodiment thus configured is described. FIG. 4 is a flowchart generally showing the overall flow of a metadata extraction model generation process performed at the business document processing device 1.

In FIG. 4, first, the central processing unit 104 loads documents to be processed from the sample document DB 101, and holds them in the form of document data 113 (step 400). It is noted that documents stored in the sample document DB 101 have metadata types pre-specified by users, such as "title," "client name," for example.

Next, the layout feature use settings processing part 107 performs a process of configuring settings for the use of layout features (step 401). This process will be described in detail in connection with FIG. 5.

In addition, the proximate text string feature use settings processing part 108 performs a process of configuring settings for the use of features of text strings that appear in proximity (step 402). This process will be described in detail in connection with FIG. 8.

Further, the partial text string feature use settings processing part 109 performs a process of configuring settings for the use of partial text string features (step 403). This process will be described in detail in connection with FIG. 11.

It is noted that processes 401 to 403 are exclusive processes, and that they may each be executed on their own, or in combination.

<Details of Layout Feature Use Setting Process>

Figure 5:
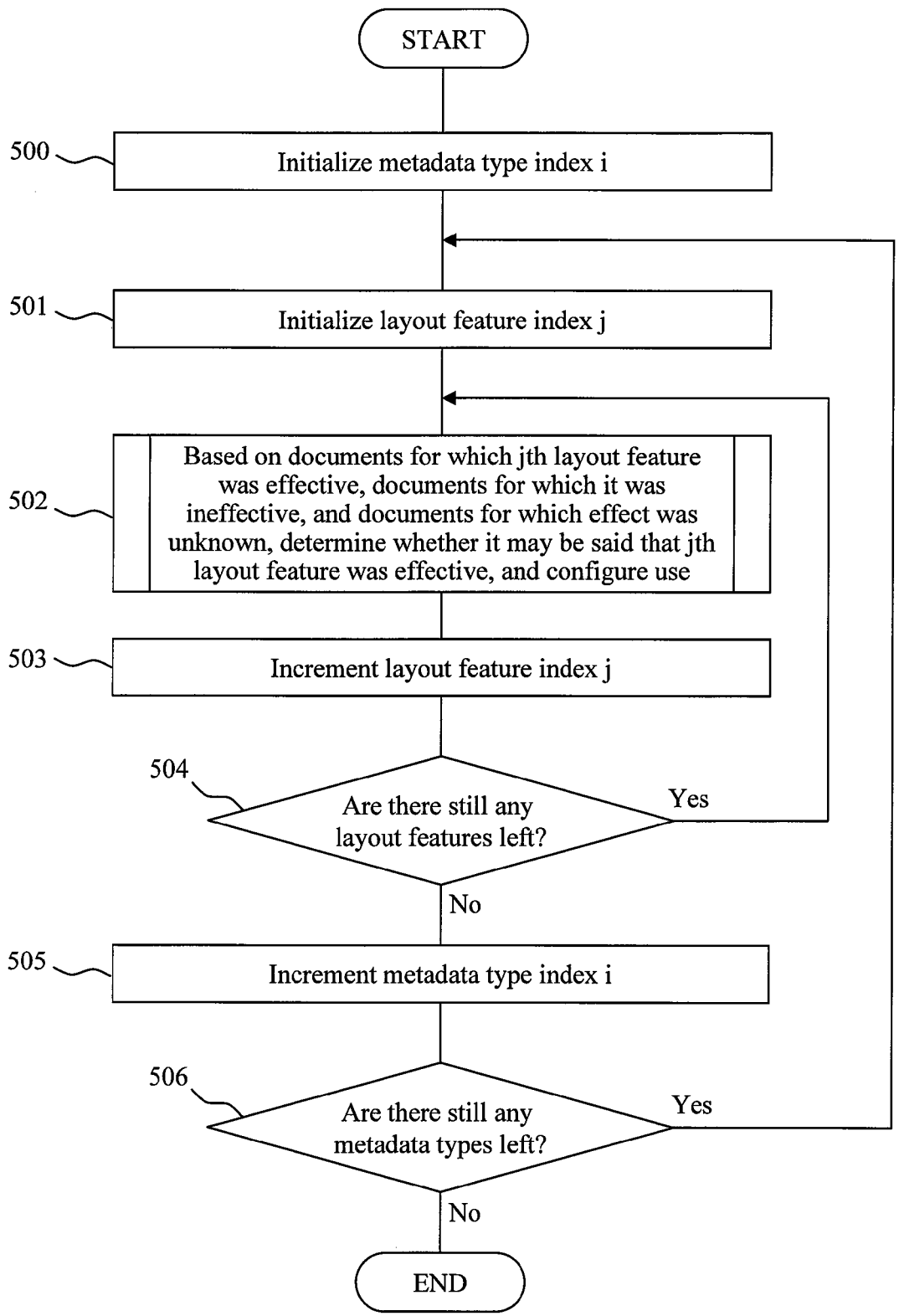
FIG. 5 is a flowchart illustrating a detailed operation executed at a layout feature use settings processing part.

FIG. 5 is a flowchart illustrating the details of the process of step 401 in FIG. 4. First, in order to sequentially process such metadata types as title, author, creation date, etc., the layout feature use settings processing part 107 initializes index i (step 500).

Next, in order to sequentially process such layout features as underline, centering, font size, etc., the layout feature use settings processing part 107 initializes index j (step 501).

Thereafter, using the layout feature use adjustment processing part 110 and based on the sample documents for which the jth layout feature was effective, the sample documents for which it was ineffective, and the sample documents for which the effect was unknown, the layout feature use settings processing part 107 determines whether or not the jth layout feature may be said to be effective for metadata acquisition, and configures the settings regarding use/non-use (step 502). This process will be described in detail in connection with FIG. 6.

Then, the layout feature use settings processing part 107 increments index j for the layout features by just 1 (step 503), and returns to step 502 to repeat the process if there are still any layout features left (step 504). In addition, the layout feature use settings processing part 107 increments index i for the metadata types by just 1 (step 505), and returns to step 501 to repeat the process if there are still any metadata types left (step 506).

Figure 6:
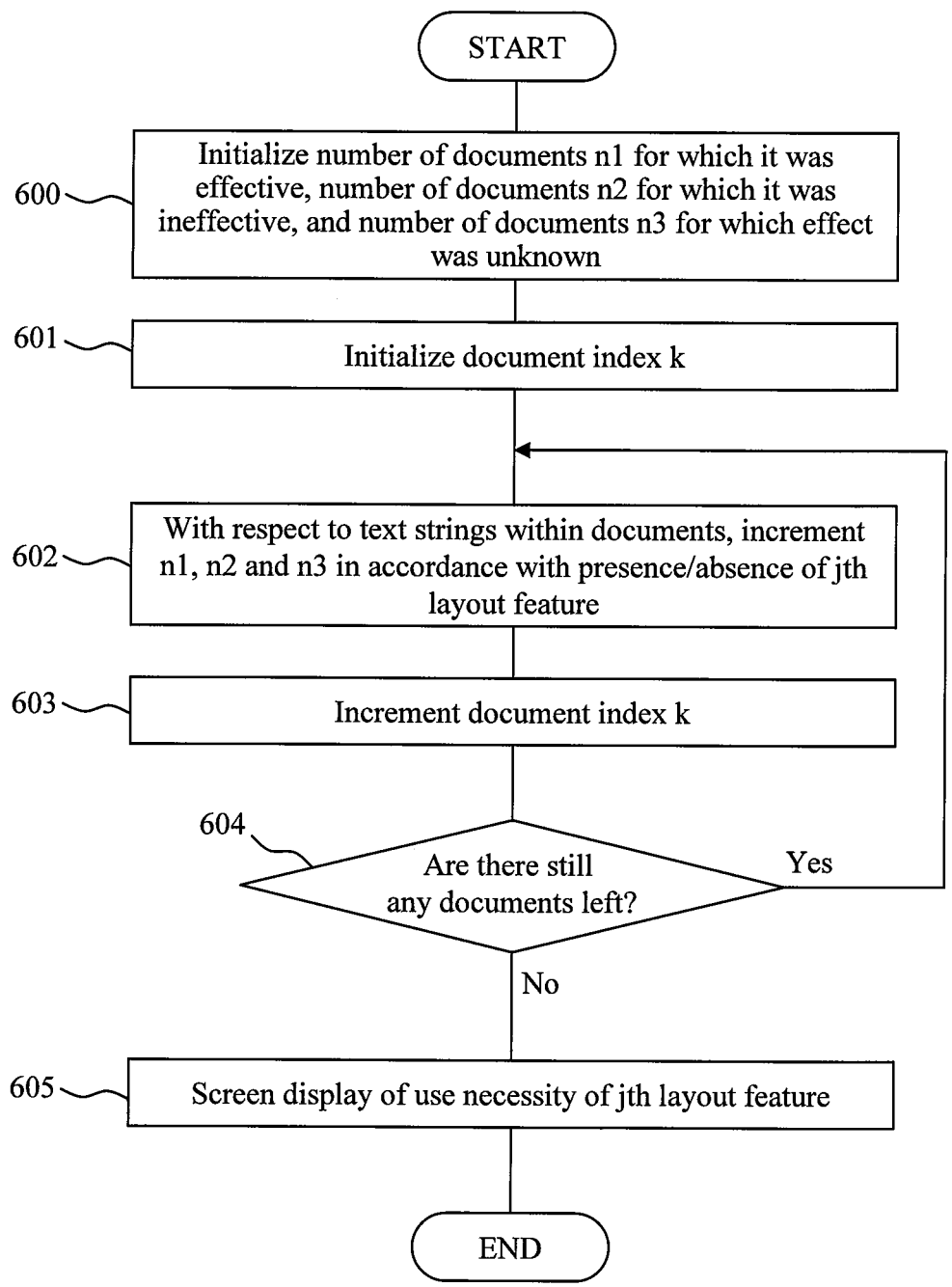
FIG. 6 is a flowchart illustrating a detailed operation executed at a layout feature use adjustment processing part.

FIG. 6 is a flowchart illustrating the details of the process of step 502 in FIG. 5. First, the layout feature use adjustment processing part 110 initializes counter n1, which is for counting sample documents for which the layout feature was effective for metadata acquisition, counter n2, which is for counting sample documents for which it was ineffective, and counter n3, which is for counting sample documents for which the effect was unknown (step 600). In addition, the layout feature use adjustment processing part 110 initializes index k in order to sequentially process the sample documents loaded in step 400 (step 601).

Next, the layout feature use adjustment processing part 110 checks the content 202 included in the document data with respect to the kth sample document, and compares text string data for which the jth layout feature of the layout features 209 is true with text string data that has the metadata type ID 300 with respect to the ith metadata in FIG. 5 as the correct metadata specifying ID 206 (step 602). If the former text string data and the latter text string data are an exact match, this would signify the fact that the ith metadata may be acquired from the kth sample document by using the jth layout feature. Accordingly, n1, which is the number of sample documents for which the jth layout feature was effective, is incremented. If the former text string data and the latter text string data are distinct, this would signify the fact that if one were to attempt to acquire the ith metadata from the kth sample document using the jth layout feature, the wrong metadata would be acquired. Accordingly, n2, which is the number of sample documents for which the jth layout feature was ineffective, is incremented. For all other cases, the effect is unknown, and n3 is therefore incremented. By way of example, if the metadata type data is "title" and the layout feature is "centering," it is checked within the kth document whether or not the text string that has been specified by the user as being the title is centered, and, further, it is checked whether or not there are any centered text strings besides the specified title. If there are no centered text strings other than the specified text string, it is found that this layout feature, namely centering, is effective for metadata extraction, and n1 is incremented.

Figure 7:
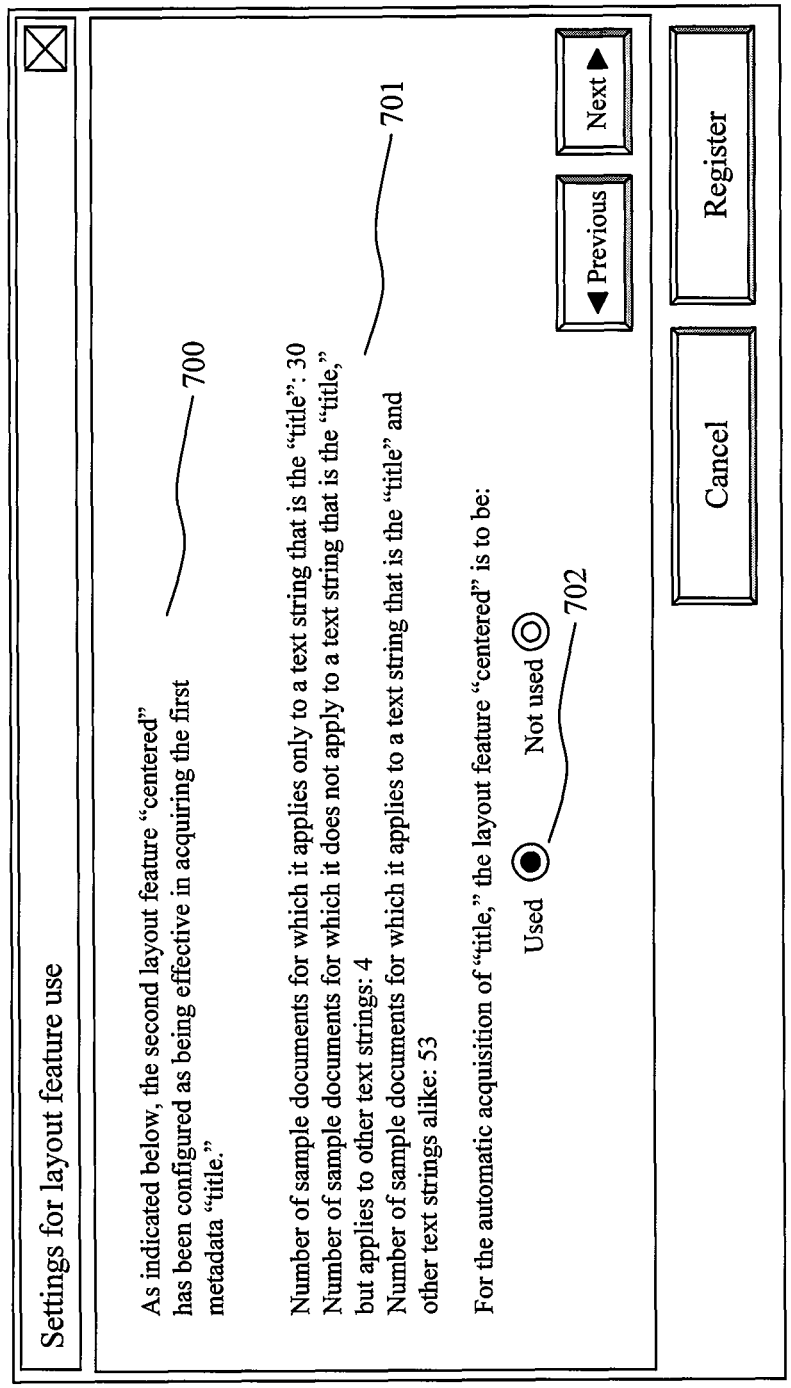
FIG. 7 is a diagram showing a confirmation screen displayed at a layout information use adjustment processing part.

Thereafter, the layout feature use adjustment processing part 110 increments index k for the sample documents by just 1 (step 603), and returns to step 602 to repeat the process if there are still any sample documents left (step 604). Next, based on the values of n1, n2 and n3, the screen display shown in FIG. 7 is performed (step 605). By way of example, a screen display is performed as to whether there are many passages for which the use of the layout feature "centering" is effective in extracting metadata ("title" in this example) or there are many passages for which it is counter-effective. Based on the above, it is determined whether or not "centering" should be used for title acquisition.

FIG. 7 is a diagram showing a layout feature use settings result display screen (GUI). In this result display screen, a use necessity calculated based respectively on the value of i in FIG. 5, the metadata type name 301 of the ith metadata type data, the value of j in FIG. 6, and the values of n1, n2 and n3 is displayed as to how the use necessity of which layout feature has been configured with respect to which metadata type (700). Of the above, use necessity, by way of example, may be determined as being effective when n1≥n2 and ineffective otherwise, and so forth. In addition, in this result display screen, the values of n1, n2 and n3 are displayed as information for providing the user with grounds for determining use necessity (701). Further, in this result display screen, radio buttons that indicate use necessity while at the same time accepting user specification are disposed at 702. Layout features for which the user specifies "used" here will have their corresponding elements of the used layout features 302 of the metadata type data set to true, while they will be set to false for layout features for which "not used" is specified.

<Details of Proximate Text String Feature Use Setting Process>

Figure 8:
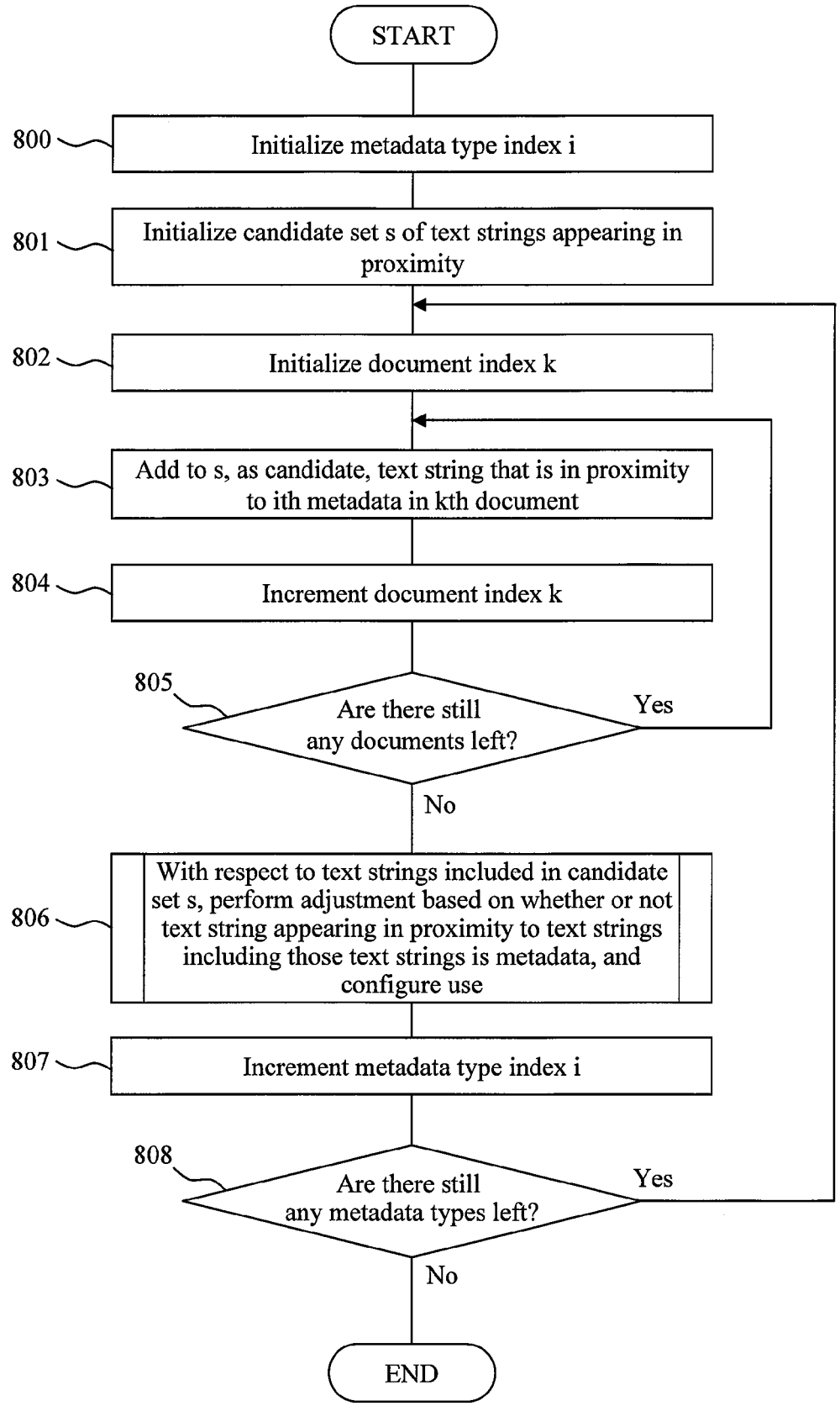
FIG. 8 is a flowchart illustrating a detailed operation executed at a proximate text string feature use settings processing part.

FIG. 8 is a flowchart illustrating the details of the process of step 402 in FIG. 4. First, the proximate text string feature use settings processing part 108 initializes metadata type index i, candidate set s of text strings that appear in proximity, and index k for sample documents (step 800, step 801 and step 802).

Next, the proximate text string feature use settings processing part 108 sequentially checks the correct metadata specifying IDs 206 of the text string data included in the content 202 with respect to the kth sample document. If there is text string data that has the ID 300 of the ith metadata type, the text string 205 itself, or a partial text string, of the text string data of the text string ID held in the adjacent text string ID 207 or the adjacent cell text string ID 208 is added to s as a candidate (step 803). In so doing, a value is also set for the directional specification 306 for the proximate text string feature data in accordance with which direction it is adjacent in relative to the text string that is specified as correct metadata. Thereafter, the proximate text string feature use settings processing part 108 increments index k for the sample documents by just 1 (step 804), and returns to step 803 to repeat the process if there are still any sample documents left (step 805). Through the process up to this point, all candidates of proximate text string data are collected with respect to specific metadata type data (e.g., "title").

Next, the proximate text string feature use settings processing part 108 determines, with respect to the text strings included in candidate set s and based on whether or not text strings appearing in proximity to text strings including those text strings are metadata, whether or not the candidate text strings may be said to be effective for metadata acquisition, and configures use/non-use (step 806). Specifically, with respect to specific metadata, it is checked whether text strings in the vicinity of the candidate text strings are solely text strings of metadata or completely different text strings also exist (reverse checking). By way of example, with respect to the metadata "client name," whereas only client names exist in the vicinity of the proximate text "御中 (onchu, Japanese for 'to')," what appears in the vicinity of the proximate text "行 (Yuki, Japanese for 'to')" is not necessarily a "client name" and other text strings (e.g., ABCD 銀行 (Ginkou, Japanese for 'bank')) may sometimes be found. It is thus determined that "行" is not effective for metadata acquisition. Details of this process will be described using FIG. 9.

Then, the proximate text string feature use settings processing part 108 increments index i for the metadata types by just 1 (step 807), and returns to step 802 to repeat the process if there are still any metadata types left (step 808).

Figure 9:
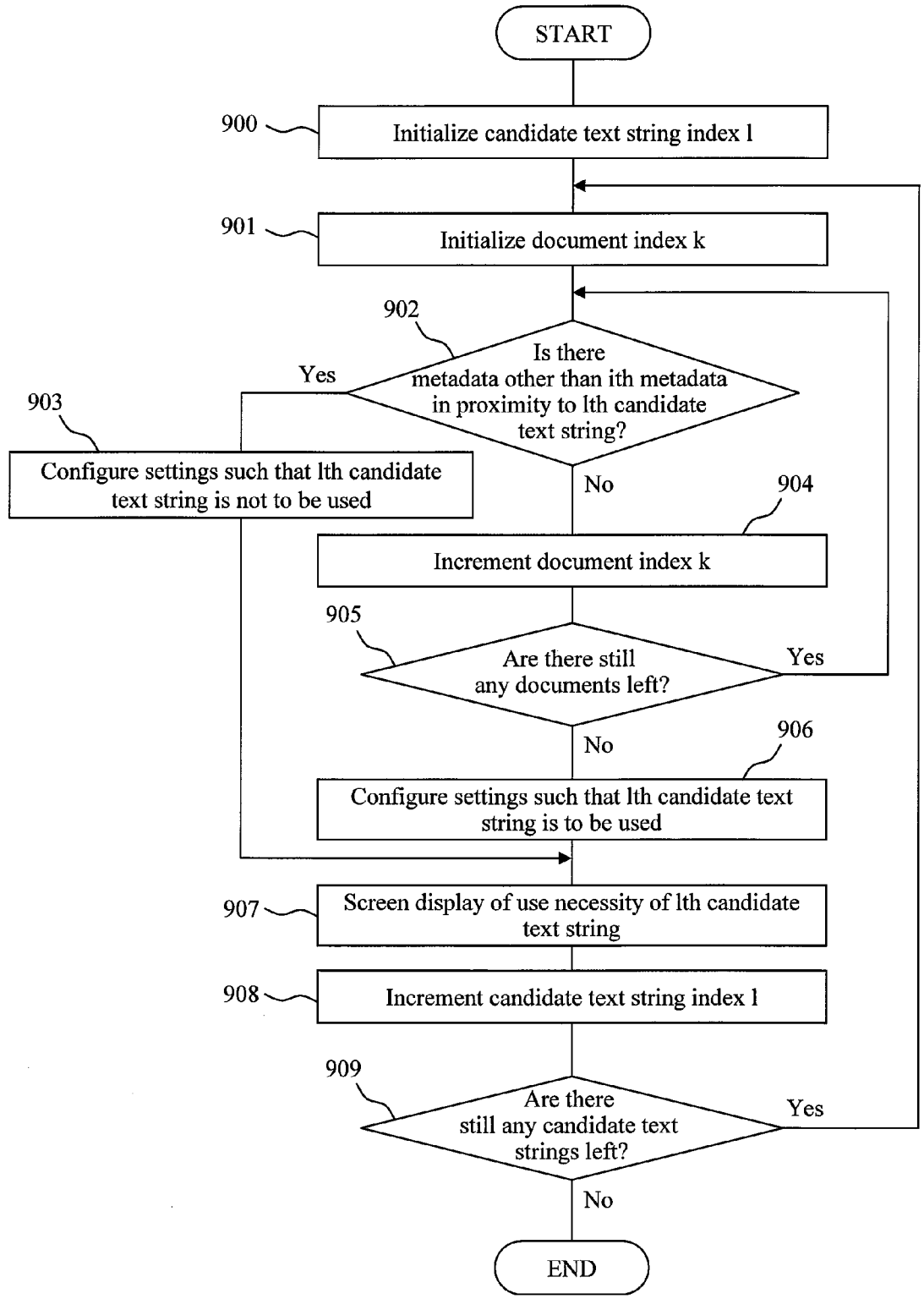
FIG. 9 is a flowchart illustrating a detailed operation executed at a proximate text string feature use adjustment processing part.

FIG. 9 is a flowchart illustrating the process of step 806 in FIG. 8 in detail. First, the proximate text string feature use adjustment processing part 111 initializes index l for the candidate text strings, and index k for the sample documents (steps 900 and 901).

Next, the proximate text string feature use adjustment processing part 111 checks, with respect to the lth candidate text string in the kth sample document, the proximate text string that is adjacent in the direction specified by the directional specification 306 (step 902). Here, the content 202 of the kth document data is checked, and a search is performed as to whether or not there is a text string 205 that includes the lth candidate text string. With respect to such text string data, it is checked whether or not the text string data of the text string IDs held under the adjacent text string IDs 207 and the adjacent cell text string IDs 208 has the metadata type ID 300 with respect to the ith metadata in FIG. 8 for the correct metadata specifying ID 206. If the correct metadata specifying ID 206 has a value and is not the metadata type ID 300 of the ith metadata, this would signify that if one were to attempt to acquire metadata from the kth sample document using the lth candidate text string, the wrong metadata would be acquired. Accordingly, in such cases, the proximate text string feature use adjustment processing part 111 configures the settings such that this lth candidate text string is not to be used (step 903). In all other cases, the proximate text string feature use adjustment processing part 111 increments index k for the sample documents by just 1 (step 904), and returns to step 902 to repeat the process if there are still any sample documents left (step 905).

If the loop process has been completed for all sample documents, the proximate text string feature use adjustment processing part 111 configures the settings such that the lth candidate text string is to be used (step 906). Then, the proximate text string feature use adjustment processing part 111 performs the screen display shown in FIG. 10 with respect to the use of the lth candidate text string (step 907). Further, the proximate text string feature use adjustment processing part 111 increments index l for the candidate text strings by just 1 (step 908), and returns to step 901 to repeat the process if there are still any candidate text strings left (step 909).

Figure 10:
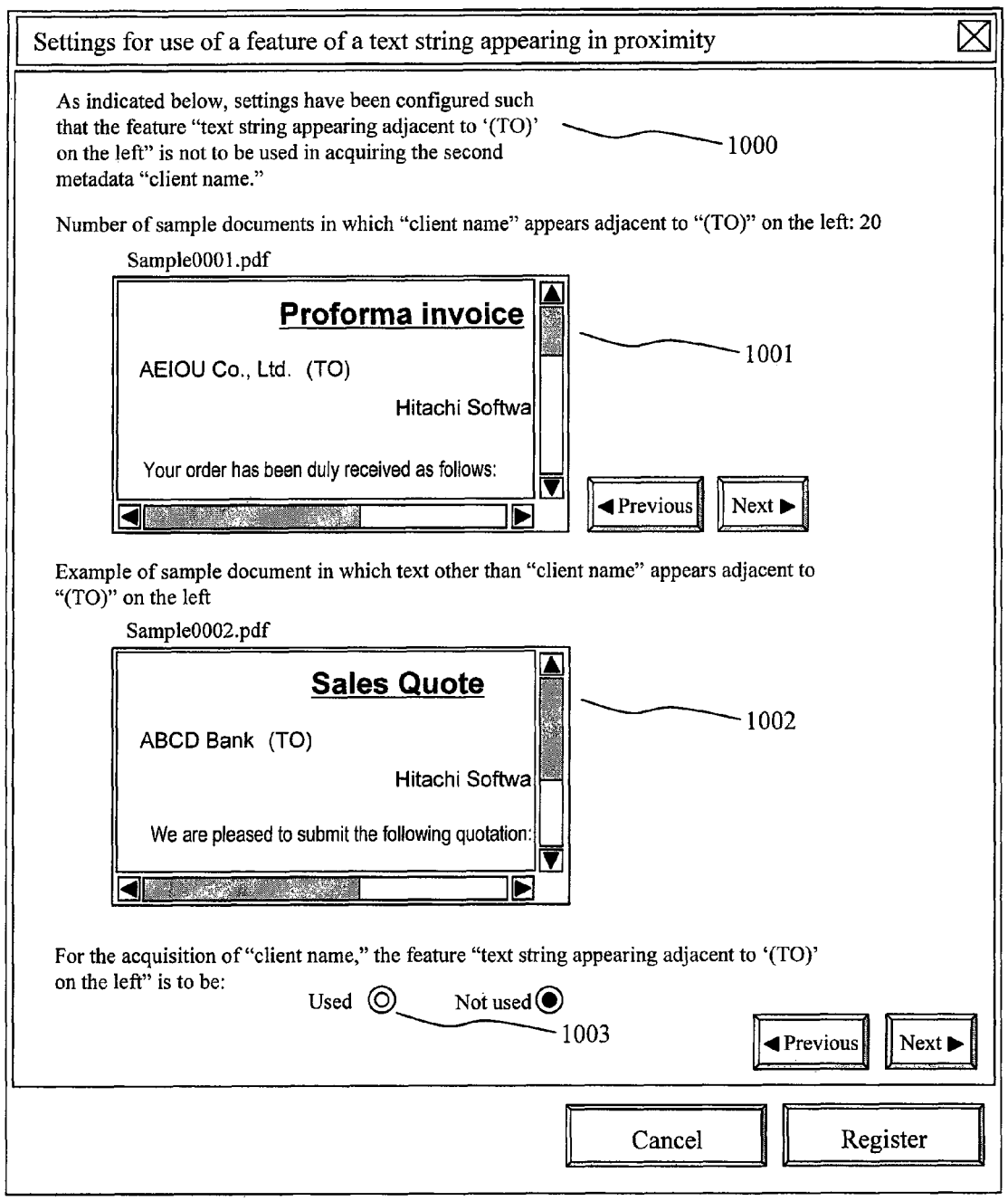
FIG. 10 is a diagram showing an example of a confirmation screen displayed at a proximate text string feature use adjustment processing part.

FIG. 10 is a diagram showing a proximate text string feature use settings result display screen (GUI). In this result display screen, the value of i in FIG. 8, the metadata type name 301 of the ith metadata type data, the lth candidate text string in FIG. 9, and the use necessity specified in step 903 or step 906 in FIG. 9 are respectively displayed as to how the use necessity of which proximate text string feature has been configured with respect to which metadata type (1000). In addition, in this result display screen, the document image 203 of a sample document from when a candidate text string was registered in step 803 in FIG. 8 is displayed at 1001, and if non-use has been configured in step 903 in FIG. 9, the document image 203 therefrom is displayed at 1002.

In addition, in FIG. 10, radio buttons that indicate the use necessity specified in step 903 or 906 in FIG. 9 while at the same time accepting user specification are disposed at 1003. Proximate text string features for which the user specifies "used" here will have their data held under the used proximate text string feature 303 of the metadata type data.

<Details of Partial Text String Feature Use Setting Process>

Figure 11:
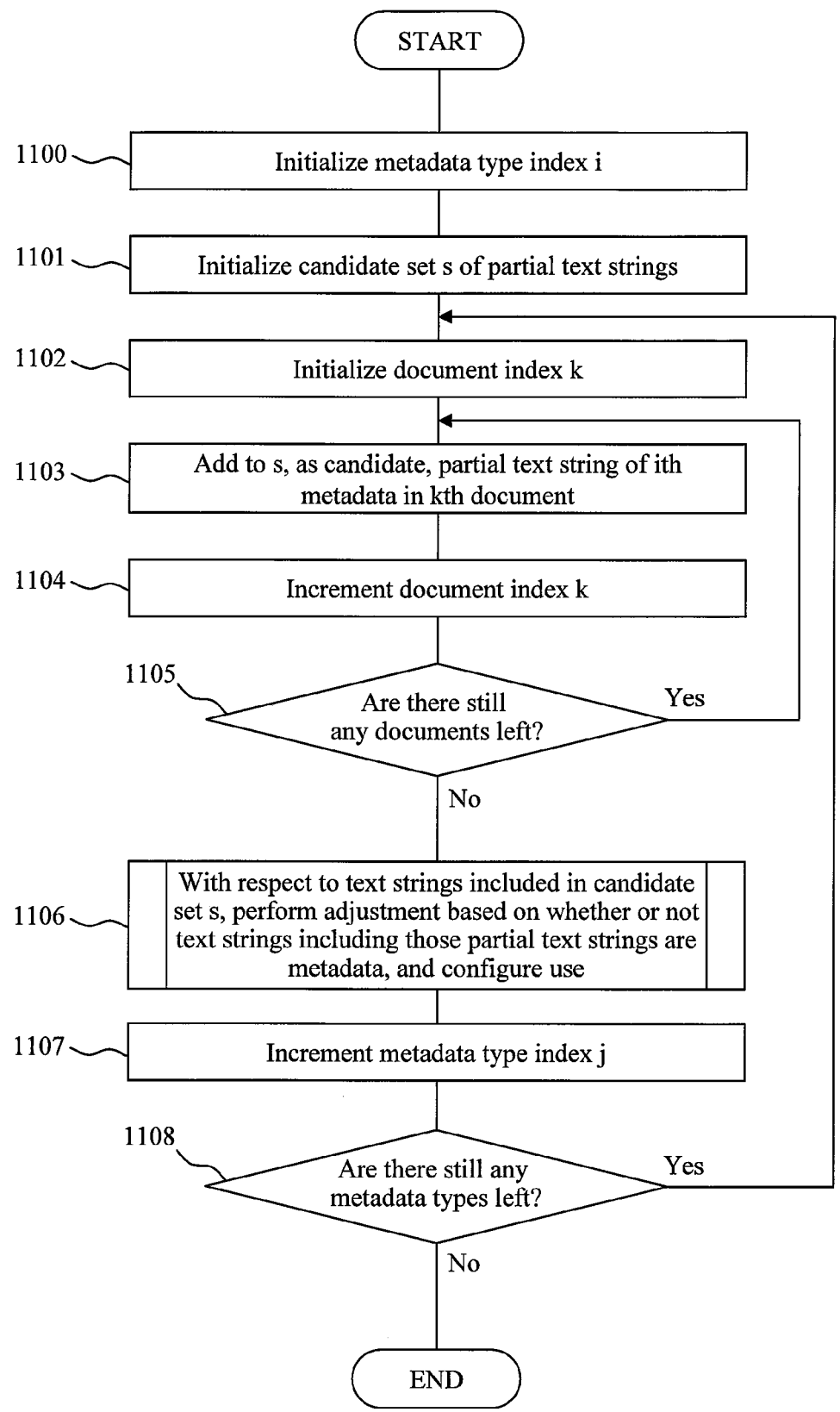
FIG. 11 is a flowchart illustrating a detailed operation executed at a partial text string feature use settings processing part.

FIG. 11 is a flowchart illustrating the details of the process of step 403 in FIG. 4. First, the partial text string feature use settings processing part 109 initializes metadata type index i, partial text string candidate set s, and sample document index k (steps 1100, 1101 and 1102).

Next, the partial text string feature use settings processing part 109 sequentially checks the correct metadata specifying IDs 206 of the text string data included in the content 202 with respect to the kth sample document. If there is text string data that has the ID 300 of the ith metadata type, the text string 205 itself, or a partial text string, is added to s as a candidate (step 1103). By way of example, if the metadata type of interest were "client name" and the text string data were "株式会社 (kabushiki gaisha, Japanese for 'Co. Ltd.') ABCD," then "株式会社," "ABCD," etc., would be added as partial text string candidates.

Subsequently, the partial text string feature use settings processing part 109 increments index k for the sample documents by just 1 (step 1104), and returns to step 1103 to repeat the process if there are still any sample documents left (step 1105).

In addition, the partial text string feature use settings processing part 109 determines, with respect to the text strings included in candidate set s and based on whether or not text strings including those text strings are metadata, whether or not the candidate text strings may be said to be effective for metadata acquisition, and determines use/non-use (step 1106). This process will be described in detail using FIG. 12.

Then, the partial text string feature use settings processing part 109 increments index i for the metadata types by just 1 (step 1107), and returns to step 1102 to repeat the process if there are still any metadata types left (step 1108).

Figure 12:
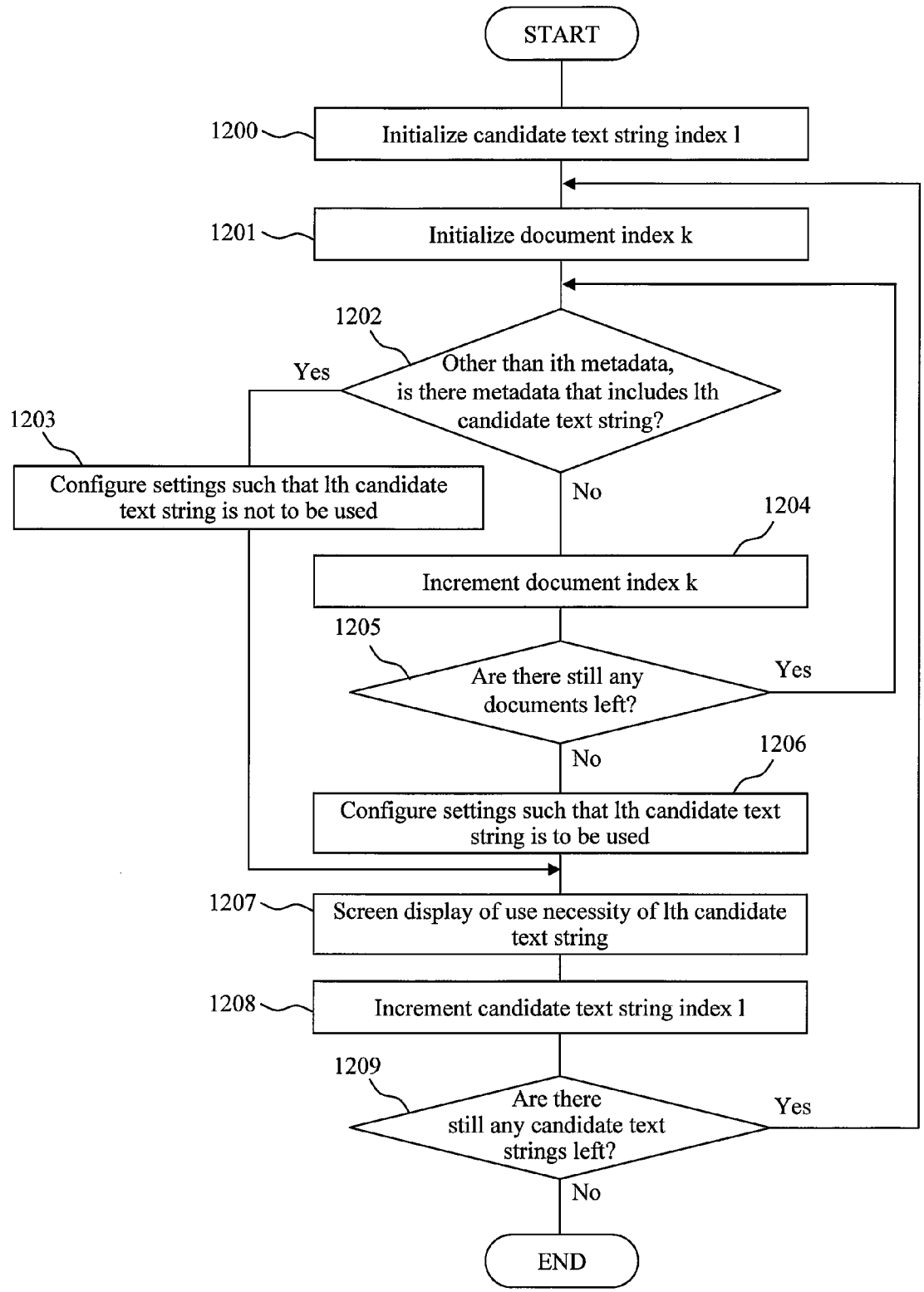
FIG. 12 is a flowchart illustrating a detailed operation executed at a partial text string feature use adjustment processing part.

FIG. 12 is a flowchart illustrating the details of step 1106 in FIG. 11. First, the partial text string feature use adjustment processing part 112 initializes index l for the candidate text strings and index k for the sample documents (steps 1200 and 1201).

Next, the partial text string feature use adjustment processing part 112 examines whether or not there is any metadata, besides the ith metadata, in the kth sample document that includes the lth candidate text string (step 1202). Here, the content 202 of the, kth document data is checked, and a search is performed as to whether or not there is a text string 205 that includes the lth candidate text string. With respect to such text string data, it is checked whether the correct metadata specifying ID 206 has the metadata type ID 300 with respect to the ith metadata in FIG. 11. If the correct metadata specifying ID 206 has a value and is not the ith metadata type ID 300, this would signify that if one were to attempt to acquire metadata from the kth sample document using the lth candidate text string, the wrong metadata would be acquired. Accordingly, in such a case, the settings are configured such that the lth candidate text string is not to be used (step 1203). By way of example, if, as discussed above, the metadata type of interest were "client name" and the text string data were "株式会社 (kabushiki gaisha, Japanese for 'Co. Ltd.') ABCD," then a determination of non-use as a candidate text string would be made if there is metadata including the text string "株式会社" despite its not being a client name.

In all other cases, the partial text string feature use adjustment processing part 112 increments index k for the sample documents by just 1 (step 1204), and returns to step 1202 to repeat the process if there are still any sample documents left (step 1205). If the loop process has been completed for all sample documents, settings are configured such that the lth candidate text string is to be used (step 1206).

Figure 13:
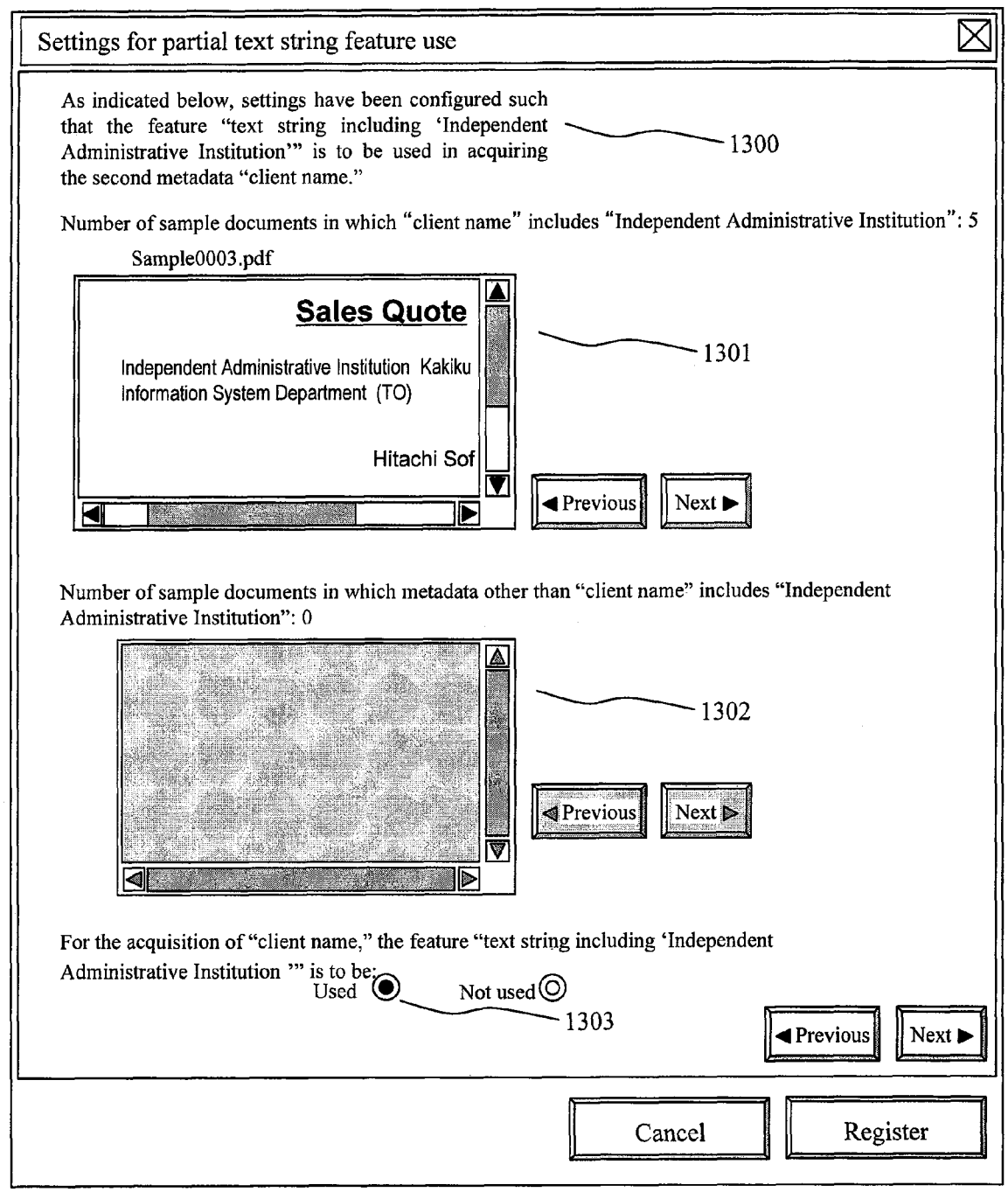
FIG. 13 is a diagram showing an example of a confirmation screen displayed at a partial text string feature use adjustment processing part.

Then, the partial text string feature use adjustment processing part 112 performs the screen display shown in FIG. 13 with respect to the use of the lth candidate text string (step 1207), increments index l for the candidate text strings by just 1 (step 1208), and returns to step 1201 to repeat the process if there are still any candidate text strings left (step 1209).

FIG. 13 is a diagram showing a partial text string feature use settings result display screen (GUI). In the result display screen in FIG. 13, the value of i in FIG. 11, the metadata type name 301 of the ith metadata type data, the lth candidate text string in FIG. 12, and the use necessity specified in step 1203 or step 1206 in FIG. 12 are respectively displayed as to how the use necessity of which partial text string feature has been configured with respect to which metadata type (1300).

In addition, in this result display screen, the document image 203 of a sample document from when a candidate text string was registered in step 1103 in FIG. 11 is displayed at 1301, and if non-use has been configured in step 1203 in FIG. 12, the document image 203 therefrom is displayed at 1302.

Further, in this result display screen, radio buttons that indicate the use necessity specified in step 1203 or 1206 in FIG. 12 while at the same time accepting user specification are disposed at 1303. Partial text string features for which the user specifies "used" here will have their data held under the used partial text string feature 304 of the metadata type data.

Variation Examples

While a basic embodiment of the present invention has been described above, variation examples such as the following are also conceivable.

(1) Although an example has been described in the present Description where the layout features 209 are held in the form of a binary array of true or false, cases where they are held as score values are also conceivable. An example would be a method where if there are an extremely small number of centered text strings in a document, the centered text strings are given high scores, and if the majority of the text strings appearing within the document are centered, the centered text strings are given scores that are not very high. In addition, there is also a method where scores would be given in accordance with the font sizes of the text strings, for example. The present invention is effective even in such cases where layout features are held as numerical values. In such cases, in the comparison in step 602, the text string data with the greatest score among the content 202 may be made to be the object of comparison.

(2) Although an example has been described in the present Description where the use necessity of a layout feature is configured with two values, namely used and not used, as in step 605, cases where it is configured in the form of a sum of weights are also conceivable. An example would be a method where, in acquiring the title, it is specified that centering and font size are to be used in a ratio of 2:3 (the score of a text string for which only centering is specified is 2, the score of a text string that is merely large in font size is 3, and the score for a text string that is centered and also has a large font size is 5), and so forth. The present invention is effective even with such methods. In such cases, once the layout feature to be used has been selected by the method discussed in the present Description, the metadata acquisition precision may be evaluated while varying the weighting, and the weighting with which high precision is attainable may ultimately be described in a model.

(3) Although an example has been described in the present Description where the directional specification 306 is held in the proximate text string feature data in addition to the text string itself 305, cases where it is accompanied with specifications of prefixes and suffixes in addition thereto are also conceivable. By way of example, in cases where it is assumed that client names appear adjacent to the text string " 御中 (on-chu, Japanese for 'to')" on the left, the likelihood that any text would be added in front of or after the text string " 御中 " is low.

Accordingly, it would be appropriate to have the specifications for prefixes and suffixes both be ON for " 御中 ."

In contrast, in cases where it is assumed that order numbers appear adjacent to the text string " 注文番号 (chuumon bangou, Japanese for 'order number')" on the right, suppose that there is a possibility that text may be added in front of or after " 注文番号 " depending on the client, as in " 御社注文番号 (onsha chuumon bangou, Japanese for 'your order number')" or " 注文番号 (継続取引分) (chuumon bangou (keizoku torihiki bun), Japanese for 'order number (for continuous transaction)')." In such cases, it would be appropriate to have the specifications for prefixes and suffixes be OFF. The present invention is effective even with methods where such specifications may be made. In such cases, specifications for prefixes and suffixes may be made to be ON if text strings appearing in proximity to metadata are to be used as features as is, and the prefix/suffix specifications may be altered if partial text strings of proximate text strings are to be used as features.

(4) Although the use of partial text string features is collectively registered as candidate text strings in step 1103 in the present Description, registration with added specifications of prefixes and suffixes is also conceivable. By way of example, in cases where it is assumed that the text string " 独立行政法人 (dokuritsu gyousei houjin, Japanese for 'Independent Administrative Institution')" is included in client names, while the likelihood that text would be added in front of " 独立行政法人 " is low, the likelihood that text would be added thereafter is high. In such cases, it would be appropriate to have the specification for prefixes be ON, and the specification for suffixes OFF. The present invention is effective even with methods where such specifications may be made. In such cases, specifications for prefixes and suffixes may be made to be ON if metadata are to be used as features as is, and the prefix/suffix specifications may be altered if partial text strings are to be used as features.

(5) In the present Description, in the portion describing step 605, whether or not to use the jth layout feature is configured based solely on the magnitude relation between n1 and n2. A condition may further be added thereto, and it may be configured such that, of layout features, only a predefined number of them are used in descending order of difference between n1 and n2. It would thus be possible to prepare a model that assigns greater importance to avoiding overlearning.

(6) In the present Description, in step 902, settings are configured such that a candidate text string is not to be used only when metadata other than the ith metadata is present in proximity. A condition may further be added thereto, and settings may be configured such that "the candidate text string is not to be used" in all cases where the text string that is present in proximity is not the ith metadata. It would thus be possible to prepare a model that assigns greater importance to the precision with which those which are not metadata are reliably avoided (instead of the probability of acquiring those which are metadata without any omission).

(7) In the present Description, in step 1202, settings are configured such that a candidate text string is not to be used only when there is metadata other than the ith metadata that includes the lth candidate text string. A condition may further be added thereto, and settings may be configured such that "the candidate text string is not to be used" in all cases where a text string other than the ith metadata includes the lth candidate text string. It would thus be possible to prepare a model that assigns greater importance to the precision with which those which are not metadata are reliably avoided (instead of the probability of acquiring those which are metadata without any omission).

CONCLUSION

With a business document processing device according to an embodiment of the present invention, it is determined whether or not at least one of a layout feature that metadata to be processed within document data to be processed has, a proximate text string feature of the metadata to be processed, and a partial text string feature included in the metadata to be processed is effective in extracting the metadata to be processed from document data, and a result of that determination is outputted. Thus, by simply specifying a pair comprising a document and metadata appearing therein, the use of a layout feature, the use of a feature of a text string appearing in proximity to metadata, and the use of a partial text string feature of metadata may be configured automatically with respect to the automatic acquisition of metadata.

More specifically, the layout feature use settings processing part and the layout feature use adjustment part check whether or not a layout feature (e.g., centering) that the metadata to be processed (e.g., title) has is manifested in a text string other than metadata in the document data to be processed, and based on the result of that check, determine whether or not the layout feature is effective in extracting metadata. In addition, the proximate text string feature use settings processing part and the proximate text string feature use adjustment processing part check whether or not a proximate text string feature (e.g., 御中 (onchu, Japanese for 'to')) is manifested in close proximity to a text string other than the metadata to be processed (e.g., client name), and based on the result of that check, determine whether or not the proximate text string feature is effective in extracting the metadata to be processed.

Further, the partial text string feature use settings processing part and the partial text string feature use adjustment processing part check whether or not a partial text string feature (e.g., 独立行政法人 (dokuritsu gyousei houjin, Japanese for 'Independent Administrative Institution')) is included in a text string other than the metadata to be processed (e.g., client name), and based on the result of that check, determine whether or not the partial text string feature is effective in extracting the metadata to be processed. Thus, fine adjustments that take into account how metadata is manifested and how text strings other than metadata are manifested may be performed automatically, and metadata extraction may be executed efficiently. At the same time, since these adjustments are performed based on document features, it becomes possible to rapidly process documents. Thus, the man-hours required to prepare metadata extraction models may be reduced significantly, and a technique for automatically acquiring metadata with respect to various organizations becomes available. In other words, it becomes possible to readily introduce a business document processing device that manages and searches for documents using metadata.

In addition, with respect to a plurality of document data to be processed and for which the same metadata type (title) is specified, the layout feature use settings processing part and the layout feature use adjustment processing part calculate the number of documents in which the layout feature is manifested only in text strings of metadata (n1), the number of documents in which the layout feature is manifested only in text strings other than metadata (n2), and the number of documents in which the layout feature is manifested both in text strings of metadata and in text strings therebesides (n3), and display the respective numbers of documents. At the same time, if n1>n2, information indicating that the layout feature in question is set as a model of a feature to be watched in automatically acquiring the metadata in question is displayed on a display part (GUI). Since processed documents may thus be classified and classification results may be presented to the user, it helps the user in determining whether or not to use the presented criterion as is.

It is noted that the present invention may also be realized via program code of software that realizes the functions of the embodiments. In this case, a storage medium on which the program code is recorded is supplied to a system or a device, and a computer (or CPU, or MPU) of the system or device loads the program code stored on the storage medium. In this case, the program code itself that is loaded from the storage medium would realize the functions of the embodiments discussed above, and the program code itself or the storage medium that stores it would form the present invention. For such storage media for supplying program code, by way of example, flexible discs, CD-ROMs, DVD-ROMs, hard discs, optical discs, magneto-optical discs, CD-Rs, magnetic tape, non-volatile memory cards, ROM, etc., are employed.

In addition, it may also be arranged such that, based on instructions of the program code, an OS (operating system) running on the computer, etc., performs part or all of the actual processing, and such that the functions of the embodiments discussed above are realized through such processing. Further, it may also be arranged such that, after the program code loaded from the storage medium has been written in the computer's memory, the CPU of the computer, etc., performs part or all of the actual processing based on instructions of that program code, and such that the functions of the embodiments discussed above are realized through such processing.

In addition, it may also be arranged such that by distributing, via a network, program code of software that realizes the functions of the embodiments, this is stored on a recording means, such as a hard disc, memory, etc., of the system or device, or on a recording medium, such as a CD-RW, CD-R, etc., and such that, during use, the computer (or CPU or MPU) of that system or device loads and executes the program code stored on the recording means or the recording medium.

LIST OF REFERENCE NUMERALS

100 . . . Display device
101 . . . Sample document DB
102 . . . Keyboard
103 . . . Pointing device
104 . . . Central processing unit
105 . . . Program memory
106 . . . Data memory
107 . . . Layout feature use settings processing part
108 . . . Proximate text string feature use settings processing part
109 . . . Partial text string feature use settings processing part
110 . . . Layout feature use adjustment processing part
111 . . . Proximate text string feature use adjustment processing part
112 . . . Partial text string feature use adjustment processing part
113 . . . Document data storage part
114 . . . Text string data storage part
115 . . . Metadata type data storage part
116 . . . Proximate text string feature data storage part

The invention claimed is:

1. A document data processing device that manages documents using metadata within the documents, the document data processing device comprising:
a memory which stores document data to be processed; and
a processor which acquires the document data to be processed, from the memory, for which a type of metadata included in the documents is specified; and
an output device which outputs a first determination result by the processor,
wherein the processor determines whether or not a layout feature that metadata to be processed within the document data to be processed has is effective in extracting the metadata to be processed, to generate the first determination result, by checking whether or not the layout feature that the metadata to be processed has is manifested in a text string other than the metadata in the document data to be processed, and, based on a result of the check, determines whether or not the layout feature is effective in extracting the metadata.

2. The document data processing device according to claim 1, wherein
the processor acquires a plurality of document data as subjects of processing,
the processor, with respect to the plurality of document data to be processed for which the same metadata type is specified, calculates the number of documents in which the layout feature is manifested only in a text string of the metadata (n1) and the number of documents in which the layout feature is manifested only in a text string other than the metadata (n2); and
the output device outputs the numbers of documents, and, if n1>n2, presents information indicating that the layout feature is set as a model of a feature to be watched in automatically acquiring the metadata.

3. The document data processing device according to claim 1, wherein the processor further
determines whether or not a text string feature that is in proximity to metadata to be processed within the document data to be processed is effective in extracting the metadata to be processed to generate a second determination result; and
wherein the output device further outputs the second determination result by the processor.

4. The document data processing device according to claim 3, wherein the processor checks whether or not the proximate text string feature is manifested in proximity to a text string other than the metadata to be processed, and, based on a result of the check, determines whether or not the proximate text string feature is effective in extracting the metadata to be processed.

5. The document data processing device according to claim 1, wherein the processor further
determines whether or not a partial text string feature included in metadata to be processed within the document data to be processed is effective in extracting the metadata to be processed to generate a third determination result; and
wherein the output device further outputs the third determination result by the processor.

6. The document data processing device according to claim 5, wherein the processor checks whether or not the partial text string feature is included in a text string other than the metadata to be processed, and, based on a result of the check, determines whether or not the partial text string feature is effective in extracting the metadata to be processed.

7. A document data processing device that manages documents using metadata within the documents, the document data processing device comprising:
a memory which stores document data to be processed; and
a processor which acquire the document data to be processed, from the memory, for which a type of metadata included in the documents is specified; and
an output device which outputs a first determination result by the processor, wherein the processor determines whether or not at least two features from among a layout feature that metadata to be processed within the document data to be processed has, a proximate text string feature that is in proximity to the metadata to be processed, and a partial text string feature included in the metadata to be processed are effective in extracting the metadata to be processed, to generate the first determination result, by checking whether or not the layout feature that the metadata to be processed has is manifested in a text string other than the metadata in the document data to be processed, and, based on a result of the check, determines whether or not the layout feature is effective in extracting the metadata.

8. The document data processing device according to claim 7, wherein the processor further checks whether or not the proximate text string feature is manifested in proximity to another text string other than the metadata to be processed, to generate a second determination result, and, based on result determines whether or not the proximate text string feature is effective in extracting the metadata to be processed.

9. The document data processing device according to claim 7, wherein the processor further checks whether or not the partial text string feature is included in a text string other than the metadata to be processed, to generate a third determination result, and, based on the third determination result, determines whether or not the partial text string feature is effective in extracting the metadata to be processed.

10. The document data processing device according to claim 7, wherein
the processor acquires a plurality of document data as subjects of processing,
the processor, with respect to the plurality of document data to be processed for which the same metadata type is specified, calculates the number of documents in which the layout feature is manifested only in a text string of the metadata (n1) and the number of documents in which the layout feature is manifested only in a text string other than the metadata (n2); and
the output device outputs the numbers of documents, and, if n1>n2, presents information indicating that the layout feature is set as a model of a feature to be watched in automatically acquiring the metadata.

* * * * *